(12) United States Patent
Crimaldi et al.

(10) Patent No.: US 9,949,557 B2
(45) Date of Patent: Apr. 24, 2018

(54) BACKPACK SYSTEM

(71) Applicants: Douglas D. Crimaldi, San Marcos, CA (US); Makena M. Crimaldi, San Marcos, CA (US); Melia P. Crimaldi, San Marcos, OH (US)

(72) Inventors: Douglas D. Crimaldi, San Marcos, CA (US); Makena M. Crimaldi, San Marcos, CA (US); Melia P. Crimaldi, San Marcos, OH (US)

( * ) Notice: Subject to any disclaimer, the term of this patent is extended or adjusted under 35 U.S.C. 154(b) by 0 days.

(21) Appl. No.: 15/431,757

(22) Filed: Feb. 13, 2017

(65) Prior Publication Data

US 2017/0231370 A1    Aug. 17, 2017

Related U.S. Application Data

(60) Provisional application No. 62/294,293, filed on Feb. 11, 2016.

(51) Int. Cl.
*A45F 3/04* (2006.01)
*A45F 3/08* (2006.01)
(Continued)

(52) U.S. Cl.
CPC ............... *A45F 3/10* (2013.01); *A45F 3/08* (2013.01); *A45F 3/04* (2013.01); *A45F 3/047* (2013.01); *F16M 13/04* (2013.01)

(58) Field of Classification Search
CPC ............ A45F 3/04; A45F 3/08; A45F 3/047
(Continued)

(56) References Cited

U.S. PATENT DOCUMENTS 1,601,624 A * 9/1926 Myrtle .................. A45F 5/00
                                                            224/195
4,114,788 A * 9/1978 Zufich .................. A45F 3/08
                                                            224/153
(Continued)

FOREIGN PATENT DOCUMENTS

GB          2509731 A  *  7/2014  ............... A45F 3/04
JP         11137320 A  *  5/1999
KR      20140092856 A  *  7/2014  ............... A45F 3/04

*Primary Examiner* — Justin Larson
(74) *Attorney, Agent, or Firm* — Joseph J. Crimaldi (57) ABSTRACT

The present invention relates to a backpack system. In one embodiment, the backpack system of the present invention comprises: a harness system; an interchangeable bag; and a mounting system that joins the bag to the harness and permits the wearer to manipulate the bag in several ways so as to provide rapid access to the bag and to permit repositioning of the bag from the back of the wearer to the front or side of the wearer. In one embodiment, the harness system comprises a single bifurcated shoulder strap, or even two individual shoulder straps, and a back component that is comprised of one or more alignment features to permit alignment of connectivity of the interchangeable bag. In one embodiment, the harness system can comprise two shoulder straps, a waist and/or belt strap, and a back component that comprises one or more alignment features to align and connect the interchangeable bag. The interchangeable bag can further comprise, in some embodiments, one or more storage compartments, one or more straps that mount to either the bifurcated shoulder strap, or to one, or both, of the individual shoulder straps on the harness system via a removable connection point, and one or more actuation, or manipulation, straps the wearer of the backpack system can use grab to actuate and/or manipulate the bag. The mounting system includes one or more, two or more, or even three or more, mounting points that create a detachable connection (Continued)

between the bag and harness system and permits the wearer to remove the bag from their back whenever they need a less encumbered access to the bag component and/or to remove the backpack bag from the user's back while still wearing the harness.

14 Claims, 5 Drawing Sheets

(51) Int. Cl.
    *A45F 3/10* (2006.01)
    *F16M 13/04* (2006.01)
(58) Field of Classification Search
    USPC .......................................................... 224/183
    See application file for complete search history.

(56) References Cited

U.S. PATENT DOCUMENTS

| | | | | |
|---|---|---|---|---|
| 5,337,934 A * | 8/1994 | Johnson | ..................... | A45F 3/04 224/148.5 |
| 5,628,443 A * | 5/1997 | Deutsch | ............... | A45C 7/0086 150/113 |
| 5,657,917 A * | 8/1997 | Johnson | ..................... | A45F 3/04 224/153 |
| 5,729,869 A * | 3/1998 | Anscher | ............... | A45C 7/0086 224/272 |
| 5,732,867 A * | 3/1998 | Perkins | ..................... | A45F 3/08 224/271 |
| 5,819,999 A * | 10/1998 | Tennant | ..................... | A45F 4/02 224/153 |
| 5,988,465 A * | 11/1999 | Vitale | ..................... | A45C 15/00 224/153 |
| 6,079,602 A * | 6/2000 | Howell | ................... | A45F 3/047 224/262 |
| 6,216,926 B1 * | 4/2001 | Pratt | ........................ | A45F 3/04 224/148.2 |
| 6,216,932 B1 * | 4/2001 | Wu | .......................... | A45F 3/04 224/271 |
| 6,419,132 B1 * | 7/2002 | Reed | ...................... | A45C 15/00 109/49.5 |
| 6,629,629 B2 * | 10/2003 | Lee | ......................... | A45C 7/005 224/583 |
| 6,726,075 B1 * | 4/2004 | Patel | ........................ | A45F 3/14 224/582 |
| 7,124,921 B1 * | 10/2006 | Hubbell | ................... | A45F 3/04 224/148.2 |
| 7,175,059 B2 * | 2/2007 | Copich | .................... | A45F 3/20 224/148.2 |
| 7,316,340 B2 * | 1/2008 | Marik | ...................... | A45F 3/04 224/631 |
| 7,681,769 B2 * | 3/2010 | Kramer | .................... | A45F 3/08 224/581 |
| 7,900,757 B2 * | 3/2011 | Sisitsky | ................. | A45C 1/024 150/113 |
| 8,070,030 B2 * | 12/2011 | Marik | ...................... | A45F 3/04 224/579 |
| 8,387,843 B2 * | 3/2013 | Kramer | .................... | A45F 3/08 224/581 |
| 8,453,897 B2 * | 6/2013 | Burton | ..................... | A45F 3/04 224/199 |
| 8,690,029 B2 * | 4/2014 | Murdoch | ...................... | 224/153 |
| 8,919,628 B2 * | 12/2014 | Jamlang | ................... | A45F 3/10 224/153 |
| 9,072,365 B1 * | 7/2015 | Maneii | ..................... | A45F 3/02 |
| 9,282,806 B2 * | 3/2016 | Vierthaler | ................ | A45F 3/10 |
| 9,510,661 B2 * | 12/2016 | Murdoch | ............... | A45F 3/005 |
| 9,629,398 B2 * | 4/2017 | Goryl | ................ | A41D 13/0012 |
| 2008/0302839 A1 * | 12/2008 | Murdoch | .................. | A45F 3/04 224/153 |
| 2016/0022016 A1 * | 1/2016 | Wolffe | ..................... | A45F 3/04 224/581 |
| 2017/0079412 A1 * | 3/2017 | Romero | ................... | A45F 3/04 |

* cited by examiner

BACKPACK SYSTEM

RELATED APPLICATION DATA

This application claims priority to and is a non-provisional of U.S. Provisional Patent Application No. 62/294,293 filed Feb. 11, 2016 and entitled "Backpack System," the disclosure of which is hereby incorporated herein by reference in its entirety.

FIELD OF THE INVENTION

The present invention relates to a backpack system. In one embodiment, the backpack system of the present invention comprises: a harness system; an interchangeable bag; and a mounting system that joins the bag to the harness and permits the wearer to manipulate the bag in several ways so as to provide rapid access to the bag and to permit repositioning of the bag from the back of the wearer to the front or side of the wearer. In one embodiment, the harness system comprises a single bifurcated shoulder strap, or even two individual shoulder straps, and a back component that is comprised of one or more alignment features to permit alignment of connectivity of the interchangeable bag. In one embodiment, the harness system can comprise two shoulder straps, a waist and/or belt strap, and a back component that comprises one or more alignment features to align and connect the interchangeable bag. The interchangeable bag can further comprise, in some embodiments, one or more storage compartments, one or more straps that mount to either the bifurcated shoulder strap, or to one, or both, of the individual shoulder straps on the harness system via a removable connection point, and one or more actuation, or manipulation, straps the wearer of the backpack system can use grab to actuate and/or manipulate the bag. The mounting system includes one or more, two or more, or even three or more, mounting points that create a detachable connection between the bag and harness system and permits the wearer to remove the bag from their back whenever they need a less encumbered access to the bag component and/or to remove the backpack bag from the user's back while still wearing the harness.

BACKGROUND OF THE INVENTION

Current backpacks consist of a harness and bag that are one single unit and prevent the wearer from accessing the bag without removing the pack. Further, the wearer cannot properly sit in a typical chair, vehicle, etc. since the bag and materials in the bag prevent the wearer from fully sitting back in a chair or other seating device. For example, a typical backpack wearer must remove there backpack to sit in a car, bus, or train so that they can properly sit in the seat. In another example, a typical backpack wearer must remove or partially remove the backpack to sit on a chairlift during winter sport activities such as skiing, snowboarding, or the like.

In light of the above, there is a need in the art for a backpack system that permits the user to manipulate and/or maneuver a bag component of the backpack independently of the support portion thereof. In one such instance, the present invention enables such a goal to be accomplished via the use of harness and mounting system combination that is designed to permit rapid detachment, realignment, and reattachment of the bag component of a backpack in a repeatable manner.

SUMMARY OF THE INVENTION

The present invention relates to a backpack system. In one embodiment, the backpack system of the present invention comprises: a harness system; an interchangeable bag; and a mounting system that joins the bag to the harness and permits the wearer to manipulate the bag in several ways so as to provide rapid access to the bag and to permit repositioning of the bag from the back of the wearer to the front or side of the wearer. In one embodiment, the harness system comprises a single bifurcated shoulder strap, or even two individual shoulder straps, and a back component that is comprised of one or more alignment features to permit alignment of connectivity of the interchangeable bag. In one embodiment, the harness system can comprise two shoulder straps, a waist and/or belt strap, and a back component that comprises one or more alignment features to align and connect the interchangeable bag. The interchangeable bag can further comprise, in some embodiments, one or more storage compartments, one or more straps that mount to either the bifurcated shoulder strap, or to one, or both, of the individual shoulder straps on the harness system via a removable connection point, and one or more actuation, or manipulation, straps the wearer of the backpack system can use grab to actuate and/or manipulate the bag. The mounting system includes one or more, two or more, or even three or more, mounting points that create a detachable connection between the bag and harness system and permits the wearer to remove the bag from their back whenever they need a less encumbered access to the back and/or to remove the backpack bag from the user's back.

In still another instance, the present invention relates to a backpack system that allows the wearer to remove the bag component of the backpack system from their back while still wearing the harness and to, in another embodiment, optionally maintain a connection between the bag and the harness so as to permit the wearer to position the bag in various alternative positions whereby the bag component of the backpack system is more accessible. In one embodiment, the wearer is able to grab the bag component, or component, of the backpack system and move such bag component from a typical back carrying, or mounting, position to a front or side position to allow for normal sitting and/or easier access to the bag. Further, since in once embodiment the harness and bag are completely separable, the bag component could be made to be interchangeable to permit the user/wearer to choose between different sizes, colors and/or designs so as to permit such user/wearer to change the bag component of their backpack system as required by an activity and/or as desired based on any number of factors including, but not limited to, weather, fashion choice, size requirements, water-resistance, etc.

Accordingly, in one embodiment the present invention is drawn to a backpack system comprising: a bag component having one or more mounting components thereon; a harness component having one or more mounting components thereon; and a releasable mounting system, wherein the releasable mounting system comprises a combination of the one or more bag component mounting components with the one or more harness component mounting components, wherein the releasable mounting system permits at least a partial release of a bottom portion of the bag component of the backpack system from the harness component of the backpack system while retaining a connection between a top portion of the bag component and at least one portion of the harness component.

In another embodiment, the present invention is drawn to a backpack system comprising: a bag component having one or more mounting components thereon; a harness component having one or more mounting components thereon; and a releasable mounting system, wherein the releasable mounting system comprises a combination of the one or more bag component mounting components with the one or more harness component mounting components, wherein the releasable mounting system permits a complete release of the bag component of the backpack system from the harness component of the backpack system.

In still another embodiment, the present invention is drawn to a backpack system comprising: a bag component having one or more mounting components thereon; a harness component having one or more mounting components thereon, the harness component comprising at least two shoulder straps and one releasable or adjustable waist strap; and a releasable mounting system, wherein the releasable mounting system comprises a combination of the one or more bag component mounting components with the one or more harness component mounting components, wherein the releasable mounting system permits a complete release of the bag component of the backpack system from the harness component of the backpack system.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DETAILED DESCRIPTION OF THE INVENTION

As noted above, the present invention relates to a backpack system. In one embodiment, the backpack system of the present invention comprises: a harness system; an interchangeable bag; and a mounting system that joins the bag to the harness and permits the wearer to manipulate the bag in several ways so as to provide rapid access to the bag and to permit repositioning of the bag from the back of the wearer to the front or side of the wearer. In one embodiment, the harness system comprises a single bifurcated shoulder strap, or even two individual shoulder straps, and a back component that is comprised of one or more alignment features to permit alignment of connectivity of the interchangeable bag. In one embodiment, the harness system can comprise two shoulder straps, a waist and/or belt strap, and a back component that comprises one or more alignment features to align and connect the interchangeable bag. The interchangeable bag can further comprise, in some embodiments, one or more storage compartments, one or more straps that mount to either the bifurcated shoulder strap, or to one, or both, of the individual shoulder straps on the harness system via a removable connection point, and one or more actuation, or manipulation, straps the wearer of the backpack system can use grab to actuate and/or manipulate the bag. The mounting system includes one or more, two or more, or even three or more, mounting points that create a detachable connection between the bag and harness system and permits the wearer to remove the bag from their back whenever they need a less encumbered access to the back and/or to remove the backpack bag from the user's back.

In still another instance, the present invention relates to a backpack system that allows the wearer to remove a bag component of the backpack system from their back while still wearing the harness and to, in another embodiment, optionally maintain a connection between the bag and the harness so as to permit the wearer to position the bag in various alternative positions whereby the bag component of the backpack system is more accessible. In one embodiment, the wearer is able to grab bag component 102, or component, of the backpack system and move such bag component from a typical back carrying, or mounting, position to a front or side position to allow for normal sitting and/or easier access to the bag while still maintaining at least a partial connection between bag component 102 and harness component 104. In another embodiment, bag component 102 and harness component 104 can be designed to totally release from one another and become two separate components when desired to be taken apart by a wearer. Further, since in one embodiment the bag component and harness component of the present invention are completely separable, the bag component could be made to be interchangeable to permit the user/wearer to choose between different sizes, colors and/or designs so as to permit such user/wearer to change the bag component of their backpack system as required by an activity and/or as desired based on any number of factors including, but not limited to, weather, fashion choice, size requirements, water-resistance, etc.

To ensure the interchangeable bag is mounted to the harness in a repeatable manner, the interchangeable bag component and harness component of the present invention are joined via a releasable mounting system. In one embodiment, the mounting system of the present invention comprises a one or more, or even two or more, mounting points that permit and ensure alignment when a bag component, or interchangeable bag component, is being installed and/or re-installed on the mounting system of the backpack of the present invention. Additionally, the mounting system of the present invention ensures that the load, if any, contained in the bag component, or interchangeable bag component, is properly transferred to the harness and in turn the body structure of the wearer.

Figures 1A, 1B:
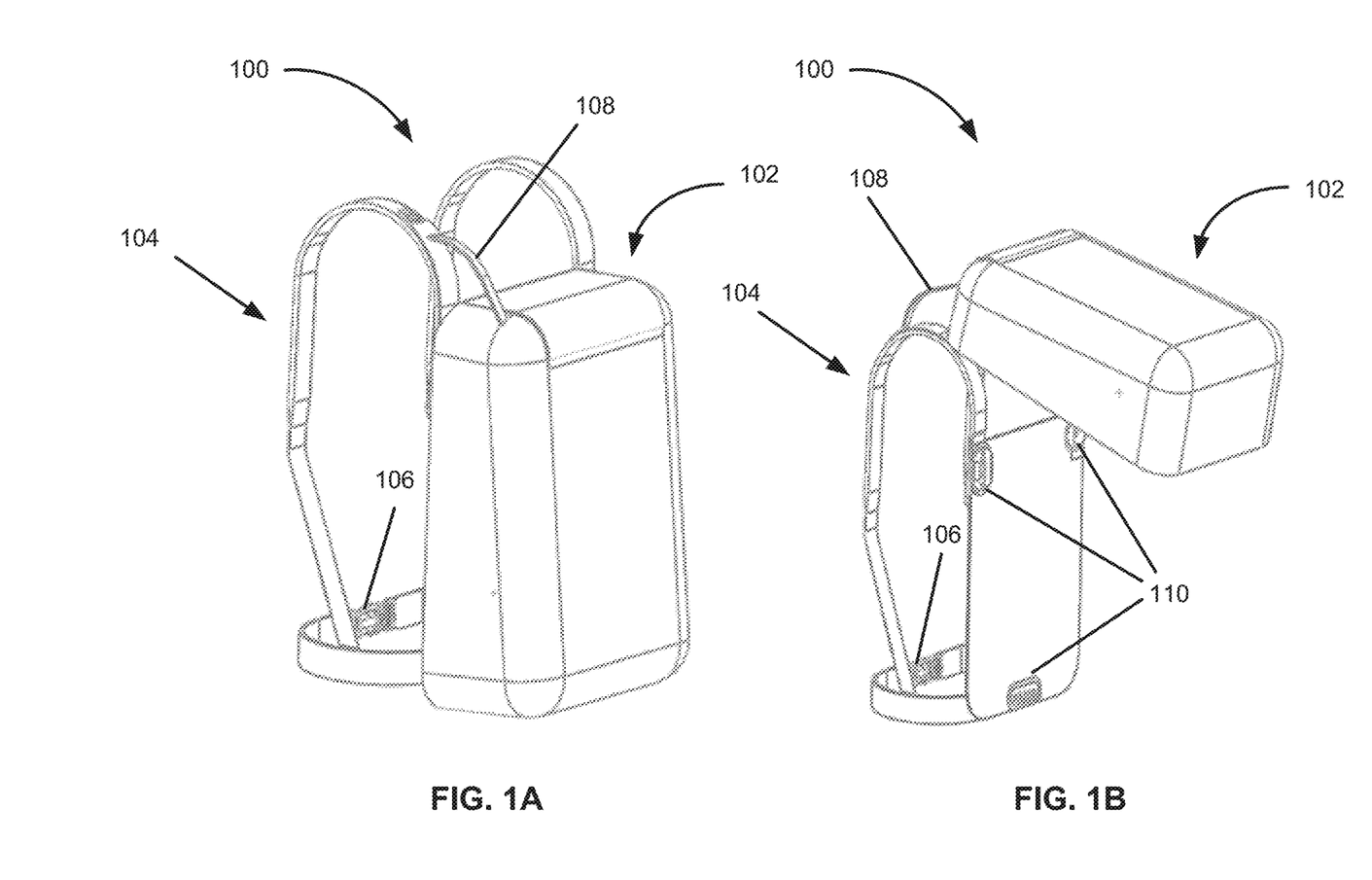
FIGS. 1A and 1B are illustrations of one embodiment of a backpack system according to one embodiment of the present invention.

Turning to the Figures, FIGS. 1A and 1B illustrate one embodiment of the backpack system 100 where system 100 is comprised of a bag component 102 and a harness component 104. In one embodiment of the present invention harness system 104 of the present invention comprises a coupling, latching or buckling device 106 so that the bottom of harness component 104 can be secured around a wearer's waist. As would be apparent to those of skill in the art, coupling, latching or buckling device 106 can be of any design so long as coupling, latching or buckling device 106 permits a user to adequately secure the bottom of harness component 104 around a wearer's waist. Since such coupling, latching and/or buckling devices are well known to those of skill in the art a detailed discussion thereof is omitted for the sake of brevity. However, by way of example suitable devices for item 106 include, but are not limited to, snap buckles, regular fabric and/or leather strap type closures, etc.

Figure 2:
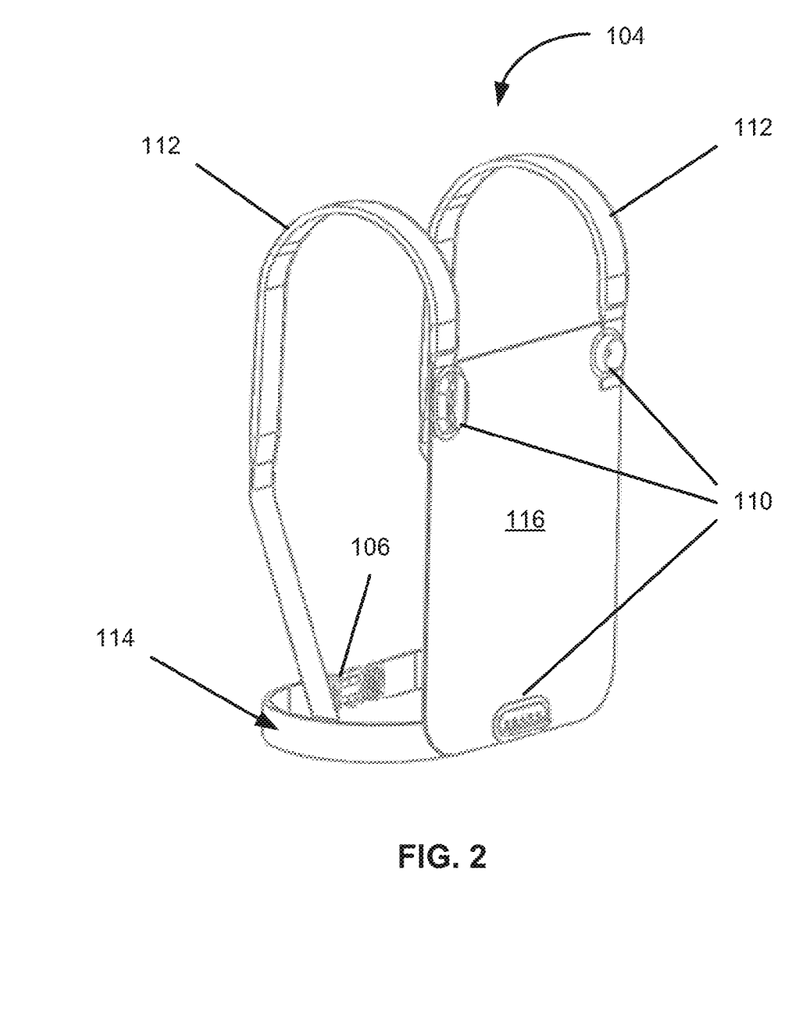
FIG. 2 is an illustration of one embodiment of a harness component of the backpack system of FIGS. 1A and 1B.

In one embodiment, as can be seen in FIGS. 1A, 1B and 2, harness component 104 comprises two shoulder straps 112, a waist strap 114 and a back plate 116. In another embodiment, shoulder straps 114 could be replaced by a single bifurcated shoulder strap having, for example, an X-shaped member slightly above the top end of back plate 116. In still another embodiment, shoulder straps 112 and waist strap 114 can be replaced by any system and/or arrangement of straps that allow the backpack system 100 to be comfortably worn by a user. As such, the present invention is not limited to any one particular arrangement of straps to permit a user to wear same.

Figure 3:
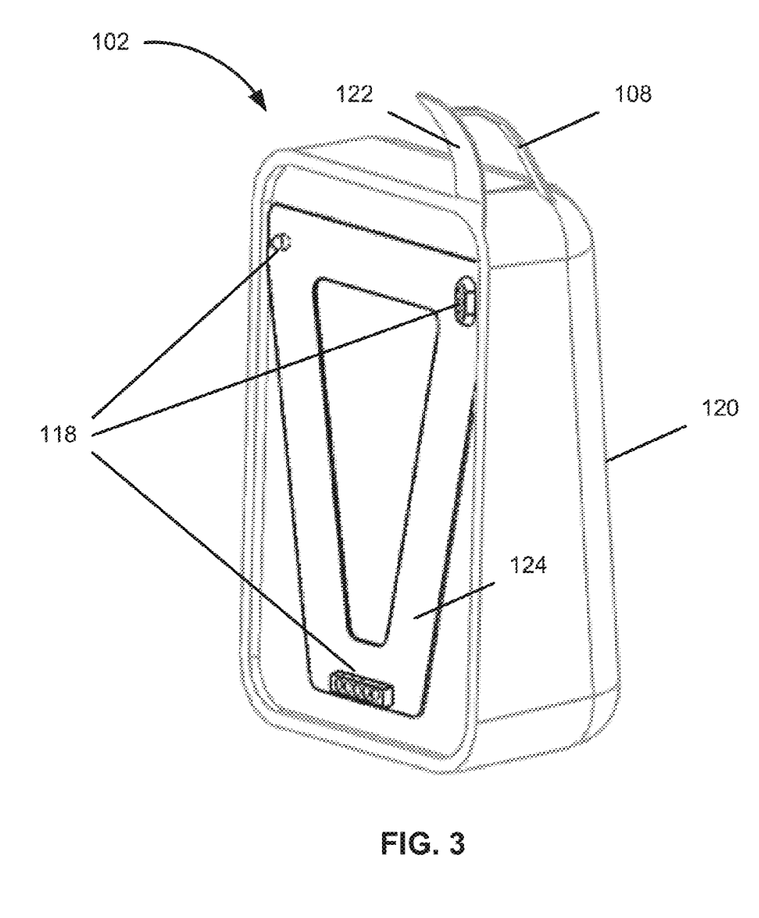
FIG. 3 is an illustration of one embodiment of a bag component of the backpack system of FIGS. 1A and 1B.

Turning to FIGS. 1B, 2 and 3, system 100 of the present invention further comprises a plurality of harness mounting components 110 and backpack mounting components 118 so that bag component 102 can be releasably mounted to harness component 104. In one embodiment, the harness component 104 could be made of fabric, polymer, metals, wood, other natural materials, or any combination of these materials. As would be apparent to those of skill in the art, the number of mounting points on both bag component 102 and harness component 104 can be any suitable number in order to permit the desired amount of weight to be contained in and born by backpack system 100. As such, the present invention is not limited to the three mounting point set-up illustrated in the attached drawings but rather could be designed to use any number of mounting points numbering one or more, or two or more, three or more, or even four or more.

In one embodiment, bag component, or interchangeable bag component, 102 comprises a bag-shaped compartmented sub-portion 120 (see FIG. 3), at least one bag grab strap 108 (see FIG. 3), and at least one connection strap 122 (see FIG. 3). The bag-shaped compartmented sub-portion 120 may be a single compartment with one or multiple access point or multiple compartments with one or multiple access points into each separate compartment. Access points to bag component 102 of the present invention may be on all sides including on the side that faces the mounting system. Bag component 102 of the present invention could be made of fabric, polymer, metals, wood, other natural materials, or any combination of these materials. The access points may be created via zippers, hook and latch materials, magnets, buttons, or other common connections used in clothes, polymer, wood, or metal. In one embodiment, the mounting systems components on bag component 102 are shown in FIG. 3 as items 118 and include a support member 124 and a plurality of mounting points and/or alignment guides 118. As would be apparent to those of skill in the art, various embodiments where grab strap 108 and connection strap 122 are eliminated are also within the scope of the present invention. Furthermore, grab strap 108 and connection strap 122 can be any shape or geometric design and does not need to be formed as illustrated in the attached Figures. For example, if present, grab strap 108 can be designed to be the only portion necessary to permit the articulation of bag component 102 from the back of a wearer to another position including, but not limited to, completely releasably removing bag component 102 from harness component 104. In this embodiment, grab strap 108 could be a horizontally positioned strap secured at the top end of bag-shaped sub-portion 120 (whether compartmented or non-compartmented).

The mounting system of the present invention which is represented by harness mounting components 110 and backpack mounting components 118 can, in one embodiment, be made of polymer, metals, wood, other natural materials, fabric, or the combination of any of these materials. In one embodiment, as is illustrated in FIGS. 1 through 3, the mounting system of the present invention can be made of metal, wood, or polymers and create a mechanical matching of the component to provide the alignment and load transfer from the bag to the harness. In still another embodiment the mounting system of the present invention can be made from magnetic mounting devices that utilize suitable magnets to permit the releasable joining of bag component 102 and harness component 104. In one instance, the magnets utilized could be rare earth magnets so that bag component 102 can be designed to carry a greater amount of weight therein. In another embodiment, the mounting system of the present invention could be formed from mechanically locking couplings that could be released by pulling a release mechanism. In still another embodiment, the mounting system of the present invention could utilize electromagnets that are powered by a batter pack attached to any suitable location of system 100. In the case where an electromagnetic mounting system is utilized the battery pack powering such a device could be formed from a rechargeable lithium ion battery or could be powered by standard changeable alkaline batteries. In still another embodiment, any suitable power source can be used to power an electromagnetic mounting system if such an electromagnetic mounting system is utilized in connection with the present invention.

Figure 4:
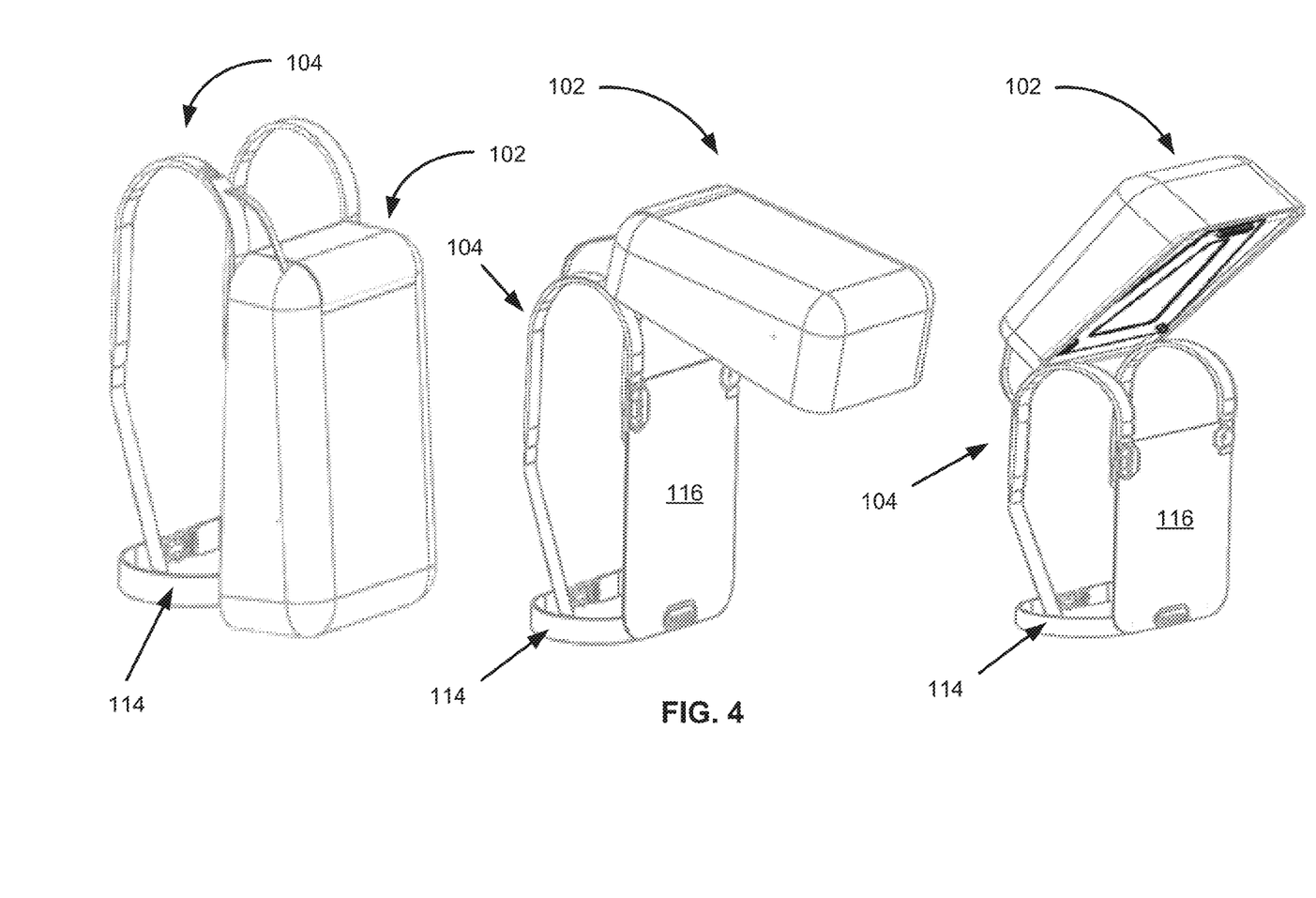
FIG. 4 is a series of illustrations depicting the movement of the bag component of the present invention from mounted to released.

In one embodiment, backpack system 100 of one embodiment of the present invention is able to be pulled over the wearer's shoulder by grabbing a portion of the grab strap 108 and pulling bag component, or interchangeable bag component, 102 over the wearer's shoulder as shown in FIG. 4. Bag component, or interchangeable bag component, 102 could be easily pulled over a wearer's shoulder and around a wearer's head and neck allowing for quick access to bag component, or interchangeable bag component, 102's content and/or to improve sitting position and/or ability.

Figure 5:
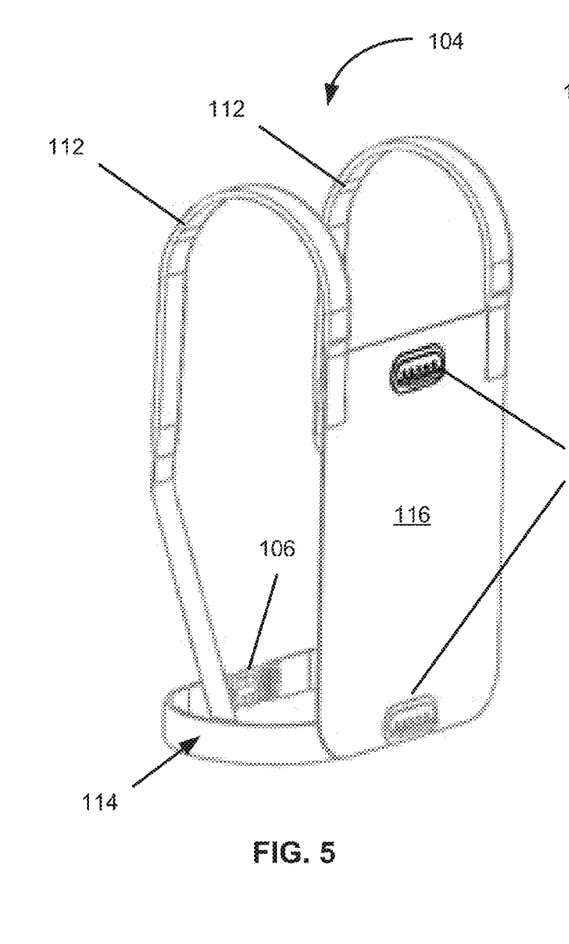
FIGS. 5 and 6 are illustrations of alternative mounting system in connection with the backpack system of the present invention.
Figure 6:
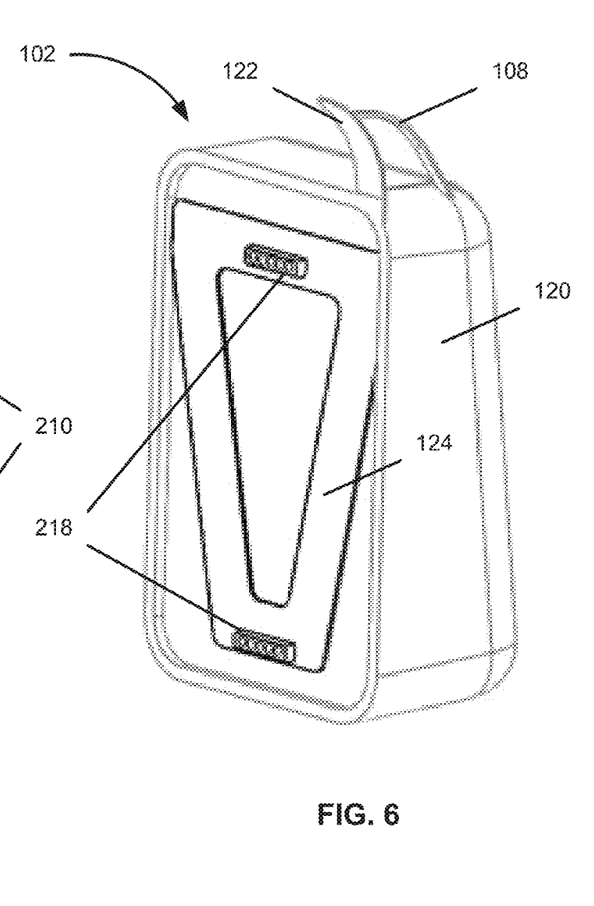

FIGS. 5 and 6 are illustrations of an alternative mounting system of the present invention that is able to releasably connect bag component 102 with harness component 104 of the present invention. As can be seen from FIGS. 5 and 6, the mounting system of this embodiment comprises harness mounting components 210 and backpack mounting components 218.

In another embodiment bag component, or interchangeable bag component, 102 and harness component 104 are connected to each other via a single point mounting system. In still another embodiment bag component, or interchangeable bag component, 102 and harness component 104 are connected to each other via a system with three or more mounting points. In all the embodiments presented, bag component, or interchangeable bag component, 102 and harness component 104 can have a passive mounting system that creates no mechanical interconnection between the harness and bag component, or interchangeable bag component, 102.

In all the embodiments presented, bag component, or interchangeable bag component, 102 and harness component 104 can have an active mounting system that creates a mechanical interconnection between the harness and bag component, or interchangeable bag component, 102.

Such mechanical interconnection between bag component 102 and harness component 104 in such an active mounting system can be created by hook and latch materials (e.g., Velcro or some equivalent material), other fabric materials, magnets, magnetic forces, adhesive, adhesive lined materials (tapes), mechanical or electro-mechanical latches, mechanical or electro-mechanical clips, snaps, fabric buttons, screws, pins, or other mechanical connections and/or alignment methods.

As would be apparent to those of skill in the art, the bag component of the backpack system of the present invention can, in one embodiment, be articulated over a wearer's head, around a wearer's side or in any other similar motion while still maintaining at least a partial connection between the bag component and the harness component of the backpack system of the present invention. In another embodiment, the bag component of the backpack system of the present invention can be articulated over a wearer's head, around a wearer's side or in any other similar motion so as to result in a total release of the bag component from the harness component of the backpack system of the present invention.

Accordingly, in one embodiment, the backpack system of the present invention permits a bag component of the backpack system of the present invention to be released, either totally or partially, from a harness component of the backpack system in at least one linear motion, at least one rotational motion or a combination of at least one linear motion and at least one rotational motion.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A backpack system comprising:
    a bag component having one or more mounting components thereon;
    a grab handle, the grab handle being affixed to one upper corner of the bag component, wherein the grab handle is formed from a grab strap having a first end and a second end and an arced connection strap having a first end and a second end where the first ends of the grab strap and the arced connection strap are attached to one another and where the second ends of the grab strap and the arced connection strap are attached to either sides of one upper corner of the bag component;
    a harness component having one or more mounting components thereon; and
    a releasable mounting system, wherein the releasable mounting system comprises a combination of the one or more bag component mounting components with the one or more harness component mounting components, wherein the releasable mounting system permits a complete release of the bag component of the backpack system from the harness component of the backpack system.

2. The backpack system of claim 1, wherein the bag component mounting components permit release of the bag component from the harness component in at least one linear motion, at least one rotational motion or a combination of at least one linear motion and at least one rotational motion.

3. The backpack system of claim 1, wherein the releasable mounting system comprises two or more mounting components on each of the bag component and the harness component of the backpack system.

4. The backpack system of claim 1, wherein the releasable mounting system comprises one or more magnetic mounting components on each of the bag component and the harness component of the backpack system.

5. The backpack system of claim 1, wherein the releasable mounting system comprises one or more mechanical locking and unlocking mounting components on each of the bag component and the harness component of the backpack system.

6. The backpack system of claim 1, further comprising at least one grab strap to permit a wearer to articulate and release the bag component from the harness component of the backpack system.

7. A backpack system comprising:
    a bag component having one or more mounting components thereon;
    a bag support member, the bag support member being attached to a backside of the bag component, wherein the one or more bag component mounting components are affixed to the bag support member;
    a grab handle, the grab handle being affixed to one upper corner of the bag component, wherein the grab handle is formed from a grab strap having a first end and a second end and an arced connection strap having a first end and a second end where the first ends of the grab strap and the arced connection strap are attached to one another and where the second ends of the grab strap and the arced connection strap are attached to either sides of one upper corner of the bag component;
    a harness component having one or more mounting components thereon, the harness component comprising at least two shoulder straps and one releasable or adjustable waist strap, wherein the harness comprises a back plate and wherein the one or more harness component mounting components are affixed to the back plate; and
    a releasable mounting system, wherein the releasable mounting system comprises a combination of the one or more bag component mounting components with the one or more harness component mounting components, wherein the releasable mounting system permits a complete release of the bag component of the backpack system from the harness component of the backpack system.

8. The backpack system of claim 7, wherein the bag component mounting components permit release of the bag component from the harness component in at least one linear motion, at least one rotational motion or a combination of at least one linear motion and at least one rotational motion.

9. The backpack system of claim 7, wherein the releasable mounting system comprises two or more mounting components on each of the bag component and the harness component of the backpack system.

10. The backpack system of claim 7, wherein the releasable mounting system comprises one or more magnetic mounting components on each of the bag component and the harness component of the backpack system.

11. The backpack system of claim 10, wherein the magnetic mounting components comprise rare earth magnets.

12. The backpack system of claim 7, wherein the releasable mounting system comprises one or more mechanical locking and unlocking mounting components on each of the bag component and the harness component of the backpack system.

13. The backpack system of claim 7, further comprising at least one grab strap to permit a wearer to articulate and release the bag component from the harness component of the backpack system.

14. The backpack system of claim 7, wherein the releasable mounting system comprises one or more electromagnetic mounting components on each of the bag component and the harness component of the backpack system.

* * * * *